Sept. 30, 1958    C. N. H. REMICK    2,854,179
BOARDING MACHINE STRUCTURE
Filed Aug. 30, 1956    2 Sheets-Sheet 1
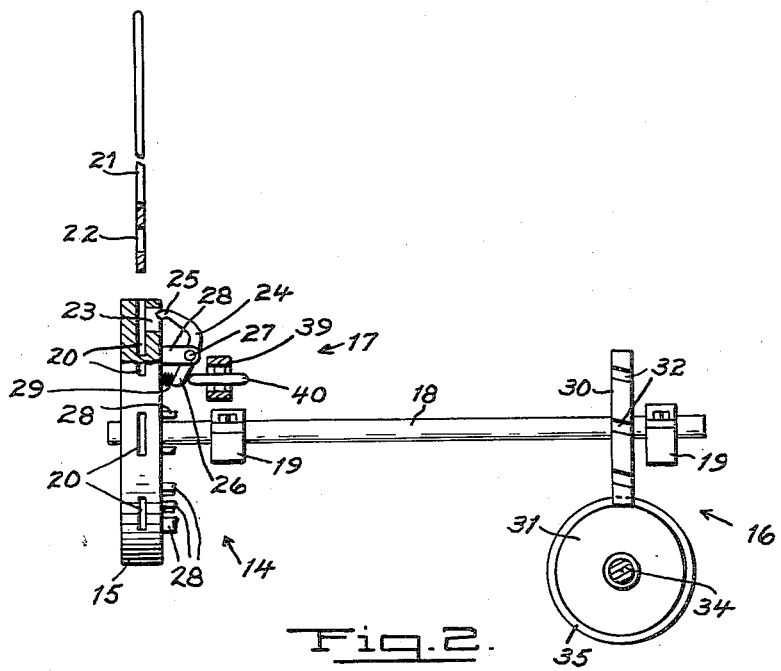
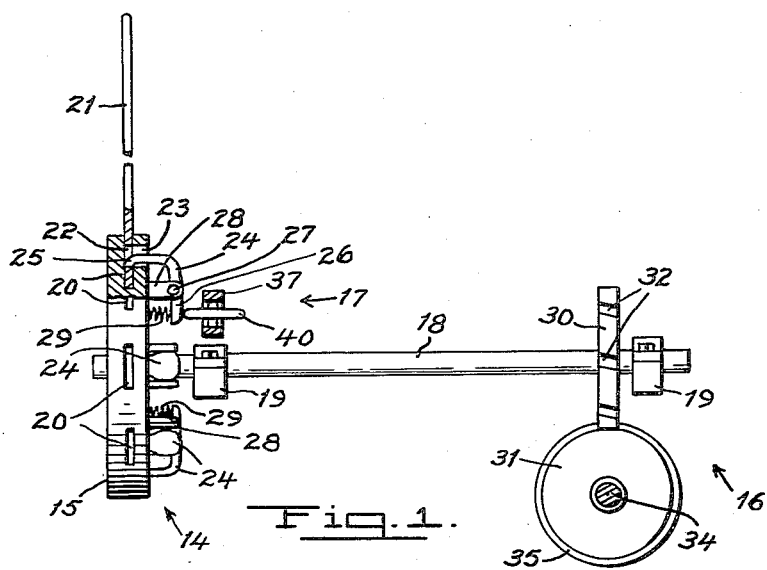
INVENTOR
C. N. HOYT REMICK.
ATTORNEY

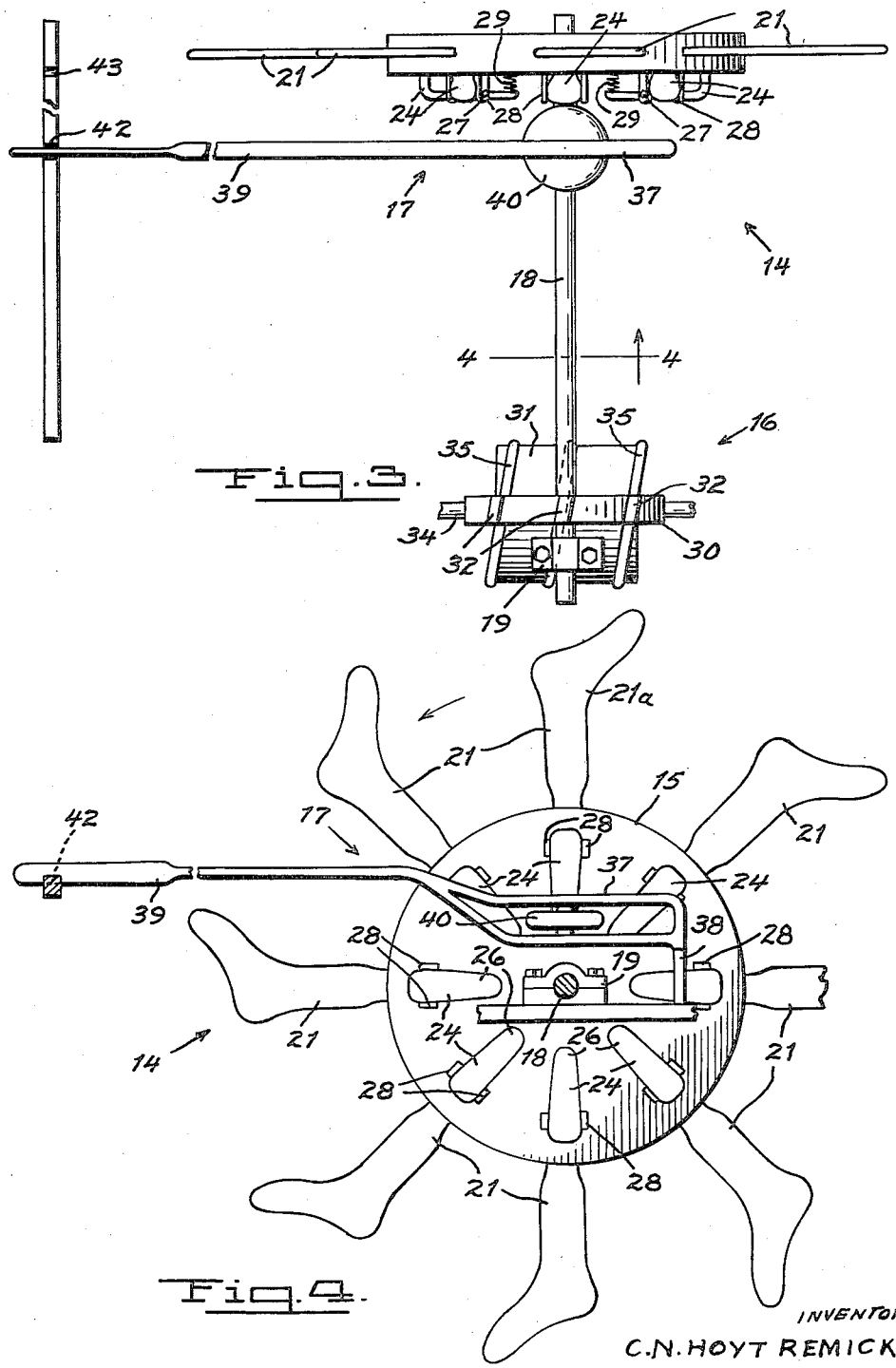

United States Patent Office 2,854,179
Patented Sept. 30, 1958

2,854,179

BOARDING MACHINE STRUCTURE

Cassius N. H. Remick, Glencoe, Ontario, Canada, assignor to Forest City Knitting Company Limited, London, Ontario, Canada, a corporation of Ontario Application August 30, 1956, Serial No. 607,007

7 Claims. (Cl. 223—75)

This invention relates to new and useful improvements in boarding machine structure.

In the art of boarding machines, articles of the knitted goods type such as hose, mittens, gloves, sweaters, underwear, etc., after being washed, are placed on shaped forms, known in the art as "boards," after which the "boards" are mounted on boarding machines for purposes of stretching and drying the articles or goods concerned. Goods of the character mentioned are manufactured in various sizes and forms and as a result different sizes and shapes of forms or boards are required to accommodate differing sizes and types of goods. At the present time, in machines of this type, the "boards" are connected to a rotatable drum or disc by means of bolts and nuts or screws. When therefore it becomes necessary to change or substitute other "boards" or "boards" of a different type, the operator of the machine must shut off the power and stop the machine when the "board" retaining bolts and nuts or screws are released, after which the "boards" are removed and substitute "boards" inserted after which the bolts and nuts or screws are reinserted and tightened to secure the "board" in operative position before the machine is again placed in operation. The stopping of the machine, the release, removal and substitution of a different "board" as set out, involves a series of movements of complex pattern, entails careful attention and considerable physical effort on the part of the operator or attendant to say nothing of the stoppage of the machine and the appreciable time factor when each of the aforementioned operations are performed.

It is therefore one of the objects of the present invention to avoid and overcome the foregoing and other objections and disadvantages by providing a device of this character wherein the changing or substituting of "boards" may be effected without interrupting the normal operation of the boarding machine.

Another object of the present invention is to provide a device of this character whereby operative rocker arms or latches are provided to mechanically lock the respective "board" members in operative positions.

A further object of the present invention is to provide a device of this character wherein each consecutive "board" is successively released and a substitute inserted and locked in the machine without the employment of bolts, nuts, etc.

Yet another object of the present invention is to provide a device of this character which conserves time, increases production and the more efficiently performs the functions required of it.

Having regard to the foregoing and other objects and advantages which will become apparent as the description proceeds and the details become known, the invention consists essentially in the novel combination and arrangement of parts hereinafter described in more particular detail and illustrated in the accompanying drawings, in which:

Fig. 1 is a side elevational view, partly in section, of an embodiment of the present invention, with the rocker arm or latch means shown retaining one of the "board" members in operative position and the remaining "board" members removed.

Fig. 2 is a view similar to Fig. 1 showing the rocker arm or latch means in released or unlocked position with the "board" member removed from the disc or drum.

Fig. 3 is a plan view of Fig. 1 in slightly enlarged form, with the "board" members shown mounted in an operative position, and Fig. 4 is a section taken on the line 4—4 of Fig. 3 showing the "board" members in operative positions.

Referring now to the accompanying drawings wherein an embodiment of the present invention is disclosed and wherein like numerals of reference designate corresponding parts in the various illustrations, the numeral 14 indicates the device as a whole and, broadly speaking, includes the board carrying disc member 15, the disc driving means 16 and the rocker arms or latch operating mechanism 17. For purposes of illustration, the present disclosure exemplifies sock receiving boards; however it is to be clearly understood that different shaped boards for supporting other and different types of articles may be employed without departing from the spirit or scope of the invention.

Referring now to the structure concerned, the disc member 15 is fixedly secured to drive shaft 18 adjacent one end thereof while the driving means 16 is located adjacent the opposing end of shaft 18. Bearings 19 rotatably support shaft 18 and are, in turn, supported by a suitable frame.

In structure, the disc member 15 is annular in form with the outer periphery thereof being provided with a series of slots or recesses 20 designated as stations. Each recess 20 extends inwardly of the disc member 15 a distance sufficient to support one end of a board member 21 and thus when inserted, the board members are arranged in radial form. Additionally, each of the board members is provided with a rocker arm engaging slot 22, the purpose of which will be later referred to.

Adjacent the outer periphery of the disc 15 and to one side thereof but in alignment with the recesses 20 a series of openings 23 are provided for the operation of rocker arms 24. As shown in Figs. 1 and 2, the rocker arms are substantially L shaped in form which provides a board engaging finger 25 and operating arm 26. The rocker arms are pivotally supported as indicated at 27 on pairs of arms 28 while resilient means in the form of coil springs 29 releasably maintains the respective rocker arms in board retaining position as more particularly illustrated in Fig. 1.

The means for rotating disc member 15 with boarding members and the shaft 18 includes a gear member 30 and drum 31. The gear member 30 is provided with a series of angular grooves 32 which conform in number to the number of board members carried by the disc 15. Drum 31 is supported by drive shaft 34 while the outer periphery of the drum is provided with a protruding rib 35 of spiral or helical form, the rib 35 being designed to engage the grooves 32 for purposes of rotating the gear 30 and drive shaft 18. The novel construction of the drum with spiral rib enables the drum to operate continuously and for every complete revolution of gear 30, the board members move from one station to the next and then stop for a matter of about three seconds until the revolution of drum 31 has been completed.

During this brief stoppage, the uppermost board member 21a is in a vertical position and it is in such position and during such brief stoppage interval that the successive board members may be released and replaced by the attendant or operator. An electric motor or other appropriate drive means with variable power control is employed to drive the shaft 34 so that the speed thereof may be varied.

The structure embodied in the rocker arm or latch operating mechanism includes a frame 37 swingably mounted on post 38 and provided with operating handle 39. Mounted in frame 37 and freely rotatable therein is the rocker arm trip or release member which is in the form of a roller 40. When in rocker arm tripping or releasing position, the roller 40 is designed to engage the outer surface of leg or arm 26 and force it toward the disc 15 together with spring 29 which is then compressed. This action causes the finger 25 to move out of engagement with the slot 22 of the board member. The board member 21 is then free to be removed after which a substituted board may be inserted in the recess 20 of the disc. As the disc 15 continues in its rotation, the roller 40 successively releases the depressed rocker arm and moves into engagement with the next succeeding rocker arm. Meanwhile, as the rocker arm is released from engagement with roller 40, expansion spring 29 comes into action and automatically forces the finger 25 of the rocker arm inwardly and into engagement with the opening 22 to automatically lock the board member in operative position.

For purposes of accuracy and to insure efficient operation of the rocker arm mechanism, the supporting frame is provided with a pair of recesses 42 and 43. Thus when the handle 39 is at rest in the recess 42, the roller 40 is in a neutral position and when swung to recess 43, the roller 40 successively engages the moving rocker arm members for purposes of releasing and then locking the board members, all during rotation of the disc 15.

*Operation*

After the board members 21 have been fitted with socks or other types of articles for stretching and drying, the free ends of the boards are slipped into the recesses 20 of disc member 15 where they are releasably locked in radially arranged form by means of rocker arms or latches 24. The electric motor or other source of power is then put into operation for rotating drum shaft 34, drum 31, gear 30, drive shaft 18 and disc 15.

As previously mentioned while the power means is in continuous operation, the gear 30, drive shaft 18 and disc member 15 periodically stop rotation for about three seconds, due to the novel structure embodied in spiral drive of drum 31 plus gear 30. During the aforementioned stoppage intervals, the board members 21 with articles thereon are ranged between heat sources which dry the stretched articles. When the articles on the boards are sufficiently dry, the attendant or operator simply moves handle 39 out of engagement with recess 42 and into engagement with recess 43. This operation moves roller 40 toward disc 15 when it engages and presses arm or leg 26 inwardly releasing board 21a from its recess and station.

With the release of board 21a and the brief stoppage interval, sufficient time is provided for the machine attendant or operator to remove the released board and substitute another board. In the next cycle of movement of the disc 15, the leg 26 of the rocker arm is released when coil spring 29 automatically comes into operation and forces finger 25 into locking engagement with the substituted board. After a series of articles have been stretched and dried, the boards are consecutively removed from the recesses and substitutes inserted and, should it become necessary, the handle 39 may be moved to recess 42 to neutralize the releasing operation of roller 40.

Changes may be made in the above and many apparently widely different embodiments constructed without departing from the spirit or the essential characteristics of the invention. It is intended therefore that the present disclosure be interpreted as illustrative and not in a limitative sense.

I claim:
1. In boarding machine structure, a rotatably mounted drive shaft, a disc member mounted on said drive shaft, the said disc member supporting a series of article carrying board members, means carried by said disc member for individually locking said board members in said disc member, means for interrupting rotation of said disc member with intermittent stoppage intervals, means spaced from said disc member for releasing a locked board member at a predetermined stoppage interval, and means for successively re-locking released board members in the disc member after the stoppage interval.

2. In boarding machine structure, a rotatably supported drive shaft, a disc member mounted on the drive shaft, the said disc member supporting a series of independent article carrying board members, rocker arms carried by the disc member independently locking the said board members in engagement with the disc member, drum means for interrupting rotative movement of the drive shaft and disc member with intermittent stoppage periods, trip means spaced from the said disc member for consecutively releasing locked board members from the said disc member at a predetermined stoppage period, and means for automatically re-locking released board members in the disc member after the stoppage period.

3. In boarding machine structure, a rotatably supported drive shaft, a disc member secured to the drive shaft, the said disc member supporting one end of a series of article carrying board members, a series of rocker arms mounted on said disc member releasably locking the said board members in independent engagement with the disc member, drum means for intermittently interrupting rotation of the said drive shaft and disc member at predetermined intervals, trip means spaced from the said disc member for successively releasing locked board members from the disc member at a predetermined interval of rotative interruption, and automatically operable means for re-locking released board members in engagement with the said disc member after the said interval of rotative interruption.

4. In boarding machine structure, a rotatably supported drive shaft, a disc member and a drive gear mounted on the drive shaft, the said disc member releasably supporting a series of article carrying board members in radially arranged form, means carried by the disc member for individually locking the said board members in engagement therewith, a driving drum for periodically interrupting rotative movement of the drive shaft, drive gear and disc member with periodic stoppage intervals, trip means spaced from the said disc member for successively and independently releasing locked board members from engagement with the disc member at a predetermined stoppage interval, and means for individually re-locking released board members in engagement with the disc member after a stoppage interval.

5. In boarding machine structure, a rotatably supported drive shaft, a disc member mounted on the drive shaft, the said disc member being formed with a series of recesses for receiving and independently supporting article carrying board members in spaced relationship, locking means carried by the said disc member for independently locking the said board members in engagement with the said disc member, means for interrupting rotative movement of the said disc member with successive stoppage intervals, trip means spaced from the said disc member for successively releasing locked board members from engagement with the said disc member at a predetermined stoppage interval, and means carried by the said disc member for automatically relocking released board members in the said disc member after a stoppage interval.

6. In boarding machine structure, a rotatably supported drive shaft, a disc member mounted on the drive shaft, a series of independent article carrying board members supported by the said disc member, locking means carried by the said disc member for releasably retaining the said board members in engagement therewith, means for interrupting rotative movement of the said drive shaft and disc member with intermittent stoppage periods, trip means spaced from the said disc member for automatically releasing individual board members from engagement with the said disc member at a predetermined point of rotation of the said disc member, means for re-locking the said board members in engagement with the said disc member after a stoppage period, and means for neutralizing the operation of the trip means.

7. In boarding machine structure, a rotatably mounted member, said member having lock means mounted thereon, board members mounted on said rotatably mounted member, each of said board members being maintained in connection with said rotatably mounted member by one of said lock means, lock operating means spaced from said rotatably mounted member and operative to engage a selected one of said lock means for operation of the latter to unlock the board member associated therewith for removal of the latter member, said lock means including means operative to automatically lock board members in connection with said rotatably mounted member, said lock operating means being constructed to engage a selected one of said lock means when the latter is at a selected location in its rotative path of movement with said rotatably mounted member.

References Cited in the file of this patent

UNITED STATES PATENTS

| | | |
|---|---|---|
| 918,062 | King | Apr. 13, 1909 |
| 1,994,980 | Cook | Mar. 19, 1935 |
| 2,605,117 | Hooz et al. | July 29, 1952 |
| 2,663,469 | Southerland | Dec. 22, 1953 |
| 2,745,191 | Southerland | May 15, 1956 |